United States Patent [19]

Atrepiev et al.

[11] 4,218,006

[45] Aug. 19, 1980

[54] BELLOWS SECTIONS WELDER

[76] Inventors: Vladimir S. Atrepiev, Tuchkovskaya ulitsa, 6, kv. 95; Mark L. Vinokur, Davydkovskaya ulitsa, 38, kv. 100; Genrikh F. Murov, ulitsa 1905 goda, 11, kv. 15, all of Moscow, U.S.S.R.

[21] Appl. No.: 934,267

[22] Filed: Aug. 16, 1978

[51] Int. Cl.$^{2}$ .............................................. B23K 37/04

[52] U.S. Cl. ................................ 228/48; 228/44.1 R; 228/212; 29/454; 219/60 A; 219/61.3

[58] Field of Search .................... 228/48, 44.1 R, 212, 228/184; 29/454; 113/116 B; 219/60 A, 60.2, 59.1, 60 R, 61, 61.3

[56] References Cited

U.S. PATENT DOCUMENTS

| | | | |
|---|---|---|---|
| 2,534,123 | 12/1950 | Hasselhorn | 29/454 |
| 2,798,146 | 7/1957 | November | 228/48 |
| 3,209,118 | 9/1965 | Dyer et al. | 219/60 A |
| 3,255,336 | 6/1966 | Purcell | 228/48 |
| 3,485,999 | 12/1969 | Stevens et al. | 219/60 A |
| 3,594,893 | 7/1971 | Kuypers | 228/173 R |
| 3,665,146 | 5/1972 | Morris et al. | 228/49 |
| 3,734,387 | 5/1973 | Sannipoli | 228/48 |
| 3,771,210 | 11/1973 | Keller | 219/125.11 |
| 3,918,622 | 11/1975 | Larsen | 29/454 |

FOREIGN PATENT DOCUMENTS

| | | |
|---|---|---|
| 439365 | 4/1975 | U.S.S.R. . |
| 491458 | 2/1976 | U.S.S.R. . |

*Primary Examiner*—Daniel C. Crane
*Attorney, Agent, or Firm*—Fleit & Jacobson

[57] ABSTRACT

The bellows sections welder according to the invention comprises a bed carrying a stationary support and a movable support with a driver chuck and a driven chuck, respectively, which chucks are kinematically interconnected. The bed further carries a welding torch and a yoke disposed between the chucks and intended for centering the ends of bellows sections being welded. The movable support is driven by at least two pneumatic cylinders symmetrically arranged with respect to the longitudinal axis of the welder. Viewed in the direction of the work movement, the movable support is preceded by adjustable stops and followed by a means to receive welded bellows sections.

8 Claims, 10 Drawing Figures

VII 4 2 3 10 15 9 16 11 5 6 35 7 19 45 44 A B 12 14 13 34 1 VII

BELLOWS SECTIONS WELDER

FIELD OF THE INVENTION

The present invention relates to welders for butt-welding sections of bellows with circumferential seams.

The invention is the most advantageous for welding large-size, thin-walled sections of bellows set in rotation about their longitudinal axis. The welder according to the invention can thus be used to produce bellows of a desired length and weld adaptors, bottoms and flanges thereto.

BACKGROUND OF THE INVENTION

There is known a welder (cf. USSR Inventor's Certificate No. 491,458) for welding articles with circumferential seams, comprising a movable bed, whereupon there is mounted an axially movable welding head with a drive, a means for pressing butt ends of components being welded against one another, and a mechanism for rotating said means.

The welder under review is applicable for butt welding of tubular articles without corrugations on their lateral surfaces.

However, in the case of welding corrugated bellows sections it is impossible to match and firmly press together the butts of sections being welded, which, in turn, makes it impossible to produce a high-strength seam. The disadvantage is due to the fact that the welder under review lacks a clamping means for pressing together the butts of corrugated sections being welded.

There is known a clamping means for welding bellows sections with circumferential seams (cf. USSR Inventor's Certificate No. 439,365). The clamping means comprises a base carrying an axle to accommodate bellows sections, a mechanism for pressing together and locking in place bellows sections, and a drive for rotating sections being welded. Said mechanism has a common drive for the locking and pressing means. These are composed of separate members so that sections being welded are not matched and pressed together over their entire butt perimeters.

The means under review makes it possible to press together and lock in place bellows sections with a diameter of 94 mm and wall thickness of 0.1 mm.

However, this means does not make it possible to weld bellows sections with thinner walls and diameters of more than 100 mm.

Besides, the clamping means under review has a limited working space, whereby the production of long bellows is either impossible or calls for a clamping means of inordinate dimensions.

There is known a welder for welding large-size articles of the shell type, comprising a bed carrying a drive for rotating an article being welded and a means for pressing together the butts of articles being welded, composed of two chucks, whereof one is installed in a stationary support and connected to the rotation drive, whereas the other is installed in a movable support. The welder further includes a pneumatic cylinder interacting with the movable support, and a leg carrying a welding torch movable along a horizontal beam.

On this type of welder, bellows sections are rotated while being welded together. The sections are fixed between the driver chuck and the driven chuck and rotated by the drive of the driver chuck. In the course of welding, the edges being welded together may get misaligned or skewed with respect to each other; both effects may take place simultaneously.

Besides, the welded bellows portion is cantilevered with respect to the bellows sections being welded, which accounts for undesirable stresses in the weld area and affects the quality of the weld.

The conventional welders are not fit for high-quality welding of thin-walled, large-size bellows sections with circumferential seams because they are unable to firmly press together the butts of sections being welded over their entire perimeter. It must be remembered in this connection that a gap even of a few hundredths of a millimeter seriously affects heat removal and may cause a burn-through. The latter of the two welders under review does not ensure an accurate centering of the outer diameters of sections being welded, nor does it provide for an accurate positioning of the butt plane, which means that the weld plane does not always extend at a perpendicular to the longitudinal axis of the article being welded. This factor also affects the quality of welding and calls for additional means to control the mutual positioning of the welding head and the weld, which, in turn, complicates the overall design of the welder.

The absence of simple and reliable welders, which would provide for high-quality welding of large-size, thin-walled bellows sections, makes it extremely difficult to manufacture large-size, thin-walled bellows and bellows units of stainless steel, having a wall thickness of 0.1 to 0.3 mm and a diameter of 200 to 800 mm.

SUMMARY OF THE INVENTION

It is the main object of the present invention to provide a welder for welding sections of bellows, which would improve the quality of welded joints in the manufacture of large-size, thin-walled bellows.

It is an equally important object of the invention to make such a welder simple in design.

It is an important object of the invention to make such a welder convenient for the operator.

The foregoing objects are attained by providing a welder for welding sections of bellows, comprising a bed carrying a stationary support with a driver chuck provided with a rotation drive, a movable support with a driven chuck, kinematically associated with pneumatic cylinders arranged symmetrically with respect to the longitudinal axis of the welder, and a support carrying a welding head, the driver and driven chucks being kinematically interconnected, each carrying a clip means one of which is spring-loaded and pressed against its chuck, the bed further carrying an expanding yoke disposed between the chucks, which yoke rests, when in the operating position, on split spring collars mounted on the respective clip means, the spring collars being tightened by swivel means and having projections on their end faces to interact with respective recesses of corrugations of bellows sections being welded together, the movable support interacting with adjustable stops arranged in front of said movable support which has behind itself a means to receive welded bellows sections.

The foregoing welder design accounts for an improved quality of welded joints in the manufacture of large-size, thin-walled bellows, which is due to the fact that the butts of sections being welded are accurately centered by the expanding yoke resting on the split collar springs which are firmly tightened by the swivel means on the clip means and are closely fitted around the perimeter of the butts of sections being welded by the clip means which is spring-loaded in relation to its chuck.

The kinematic coupling between the chucks accounts for synchronous rotation of the bellows sections being welded. The pneumatic cylinders, which fix the movable support in a desired position, prevent skewing of the edges in the welding zone. The means for receiving welded bellows sections serves the same purpose in that it supports the finished portion of bellows and thus makes it possible to manufacture bellows of considerable lengths without sagging, which otherwise might adversely affect the welded joints.

It is expedient that the kinematic coupling between the driver and driven chucks should be effected by means of gears interacting with respective gears mounted on a shaft secured in bearings installed on the bed.

This type of kinematic coupling is both simple and reliable. It also ensures synchronous rotation of sections being welded, which, in turn, accounts for a high quality of seams.

It is preferable that each of the adjustable stops should be composed of a pair of spring-loaded rods, each having a transversely extending through hole to receive a rack provided with a drive for being set in longitudinal motion and having slanted surfaces interacting with respective slanted surfaces of the walls of the holes, the rods and racks being arranged on guides mounted on the bed.

The foregoing stop design is simple enough and convenient in operation.

In addition, it helps to minimize the gap between the butts of bellows sections being welded, which is necessary for an accurate centering of the butts by the expanding yoke.

The welder according to the invention may be provided with at least one additional pair of pneumatic cylinders arranged symmetrically with respect to vertical and horizontal planes extending through the longitudinal axis of the welder.

This makes it possible to weld bellows sections of very large diameters, press the butts of the sections being welded uniformly and tightly against one another, and accurately ensure their vertical position.

The welder according to the invention may be provided with a third pneumatic cylinder, in which case it is expedient that the pneumatic cylinders should be spaced at equal distances from the longitudinal axis of the welder, as well as at an equal distance from one another; it is also expedient that the pneumatic cylinders should be arranged symmetrically in relation to the vertical plane extending through the longitudinal axis of the welder.

The above number and arrangement of the pneumatic cylinders simplify the calculation of forces required to press the butts of bellows sections being welded against one another.

It is desirable that the support carrying the welding torch should be arranged in the plane of the expanding yoke and carry a pneumatic cylinder with a rod extending through said cylinder, one end of the rod carrying the welding torch, whereas its opposite end carries a means to lock the welding torch in the welding position.

The above arrangement of the welding torch accounts for an improved quality of welded joints because the torch is rigidly secured with respect to the edges being welded. In addition, such an arrangement makes it possible to bring the welding torch rapidly and easily to both the initial and working positions.

It is expedient that the means for receiving welded bellows sections should comprise rollers whose longitudinal axes are parallel to that of the welder, the rollers being arranged on a circular arc.

This provides for free rotation of bellows sections being welded, as well as for longitudinal movement of these sections after the welding.

It is desirable that the lateral surfaces of the rollers should have a coating of polyfluoroethylene resin.

The latter factor prevents deformation of the other surface of bellows sections as these rotate in the course of welding or are moved in the longitudinal direction.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein.

DETAILED DESCRIPTION OF THE INVENTION

Figure 7:
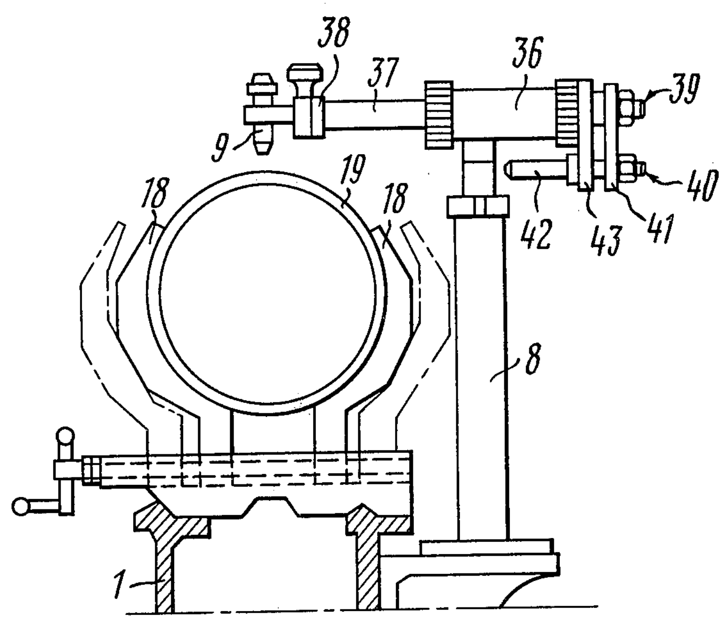
FIG. 7 is a transverse section taken on line VII—VII of FIG. 1.

Referring to the attached drawings, the welder according to the invention comprises a bed 1 (FIG. 1), whereupon there is mounted a stationary support 2 with a driver chuck 3 kinematically linked to its rotation drive 4 and to a driven chuck 5 mounted on a movable support 6 driven by at least one pair of pneumatic cylinders 7. The bed 1 also carries a support 8 (FIG. 7) which, in turn, carries a welding torch 9.

The kinematic coupling between the driver chuck 3 and the driven chuck 5 (FIG. 1) is effected by means of a gear train comprising gears 10 and 11 mounted on the chucks 3 and 5, respectively, and interacting with gears 12 and 13 mounted on a shaft 14 secured in bearings (not shown) provided in the bed 1.

The driver chuck 3 carries a clip means 15. The driven chuck 5 carries a clip means 16 which is spring-loaded by a spacer 17 (FIG. 3) of an elastic material, such as rubber.

Figure 3:
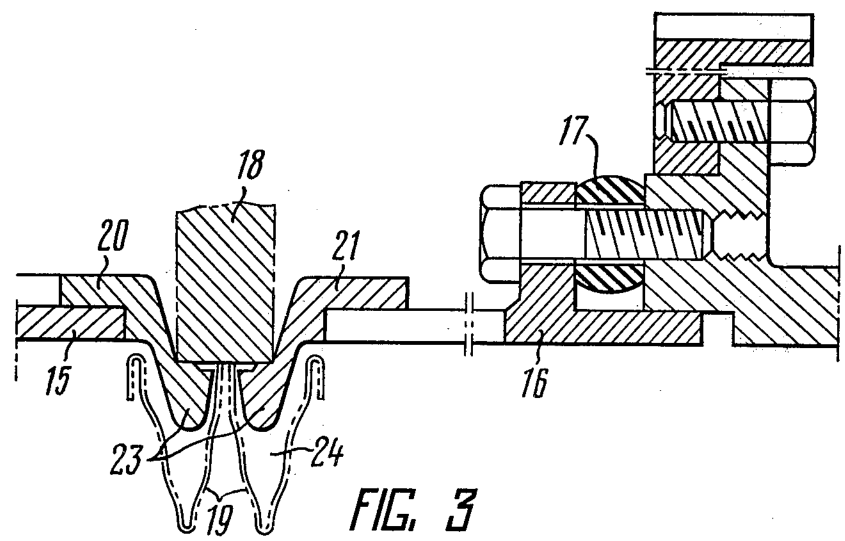
FIG. 3 is a longitudinal section taken on line III—III of FIG. 2.

Disposed between the chucks 3 and 5 (FIG. 1) is an expanding yoke 18 (FIG. 7) mounted to the bed 1 and resting, when in the working position, on split collar springs 20 and 21 (FIG. 3). The yoke 18 is intended to center the outer diameters of bellows sections 19 being welded.

Figure 2:
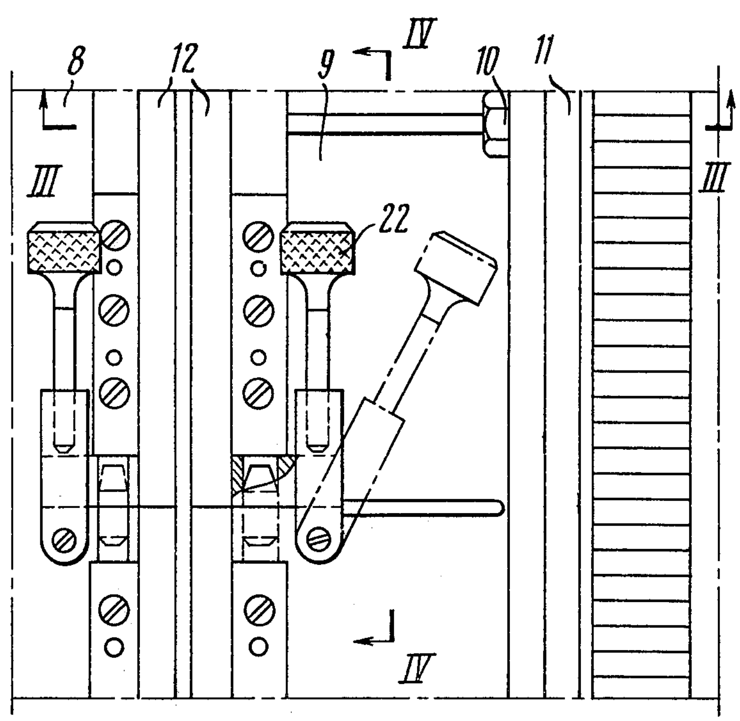
FIG. 2 is a closer view of zone A of the welder of FIG. 1.
Figure 4:
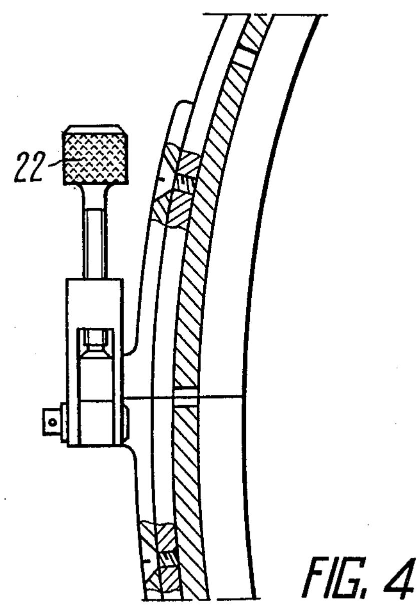
FIG. 4 is a transverse section taken on line IV—IV of FIG. 2.

Each of the clip means 15 and 16 has its own split collar spring, 20 and 21, respectively, which are tightened by swivel means 22 (FIGS. 2 and 4). The split collar springs 20 and 21 (FIG. 3) have projections 23 to interact with recesses 24 of the corrugations of the bellows sections 19 (shown by the dot-and-dash lines) being welded, which projections 23 are intended to improve the heat dissipation in the course of welding.

Viewed in the direction of movement of the bellows sections 19 being welded, the movable support 6 is preceded by adjustable stops 25 (FIGS. 5 and 6) mounted on the bed 1. Each of the adjustable stops 25 is composed of a pair of rods 26 forced by springs 27 away from the movable support 6. Each of the rods 26 has a transversely extending through hole 28 (FIG. 6) intended to receive a rack 29 provided with a drive 30 for setting it in longitudinal motion. The rack 29 has slanted surfaces 31 interacting with respective slanted surfaces 32 of the walls of the through holes 28 provided in the rods 26. The rack 29 and rods 26 are arranged in guides 33 mounted on the bed 1. The stops 25 interact with the movable support 6 so as to lock it in the desired position and thus minimize the gap (H) (FIG. 5) between the end faces of the split collar springs 20 and 21 and properly match the edges of the bellows sections 18 (FIG. 3) as these are being centered. The movable support 6 (FIG. 1) with the driven chuck 5 is driven by two or more pneumatic cylinders 7 arranged symmetrically with respect to the longitudinal axis of the welder and pivotably secured in brackets 34 mounted on the bed 1. Rods 35 of the pneumatic cylinders are rigidly coupled to the movable support 6.

The support 8 (FIG. 7), which carries the welding torch 9, is arranged on the plane of the expanding yoke 18 and also carries a pneumatic cylinder 36 with a rod 37 extending through said cylinder. Mounted at one end 38 of the rod 37 is the welding torch 9; mounted at the opposite end 39 of the rod 37 is a means 40 for locking the welding torch 9 in the welding position. The means 40 comprises a plate 41 secured at the end 39 of the rod 37 of the pneumatic cylinder 36 and carrying a guide member 42 interacting with a hole provided in a bracket 43 rigidly mounted on the housing of the pneumatic cylinder 36. The way the welding torch 9 is locked in the welding position precludes its rotation about the longitudinal axis of the housing of the pneumatic cylinder 36.

Viewed in the direction of the work movement, the movable support 6 has behind itself a means 44 for receiving the welded bellows sections 19. The means 44 is mounted on the bed 1 (FIG. 1) and composed of rollers 45 (FIG. 8) spaced on a circular arc, their longitudinal axes being parallel to the longitudinal axis (O) of the welder. The lateral surfaces of the rollers 45 (FIG. 1) have a coating of polyfluoroethylene resin.

According to an alternative embodiment, the welder is provided with additional pairs of pneumatic cylinders 46 (FIG. 8) arranged symmetrically with respect to a vertical plane 47 and a horizontal plane 48 extending through the longitudinal axis (O) of the welder.

Figure 9:
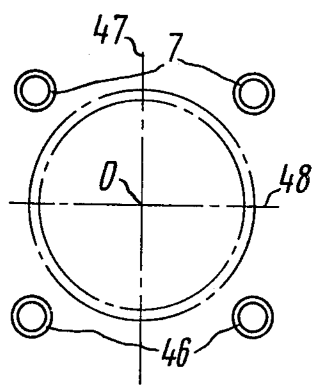
FIG. 9 is a schematic view of a second preferred arrangement of two pairs of pneumatic cylinders.

The pairs of the pneumatic cylinders 7 and 46 may be arranged as shown in FIG. 9.

The welder according to the invention may have three pneumatic cylinders 49 (FIG. 10) spaced at equal distances 1 from one another and at equal distances (r) from the longitudinal axis O of the welder, and arranged symmetrically with respect to the vertical plane 47 extending through the longitudinal axis O of the welder.

The bellows sections welder according to the invention operates as follows.

Figure 1:
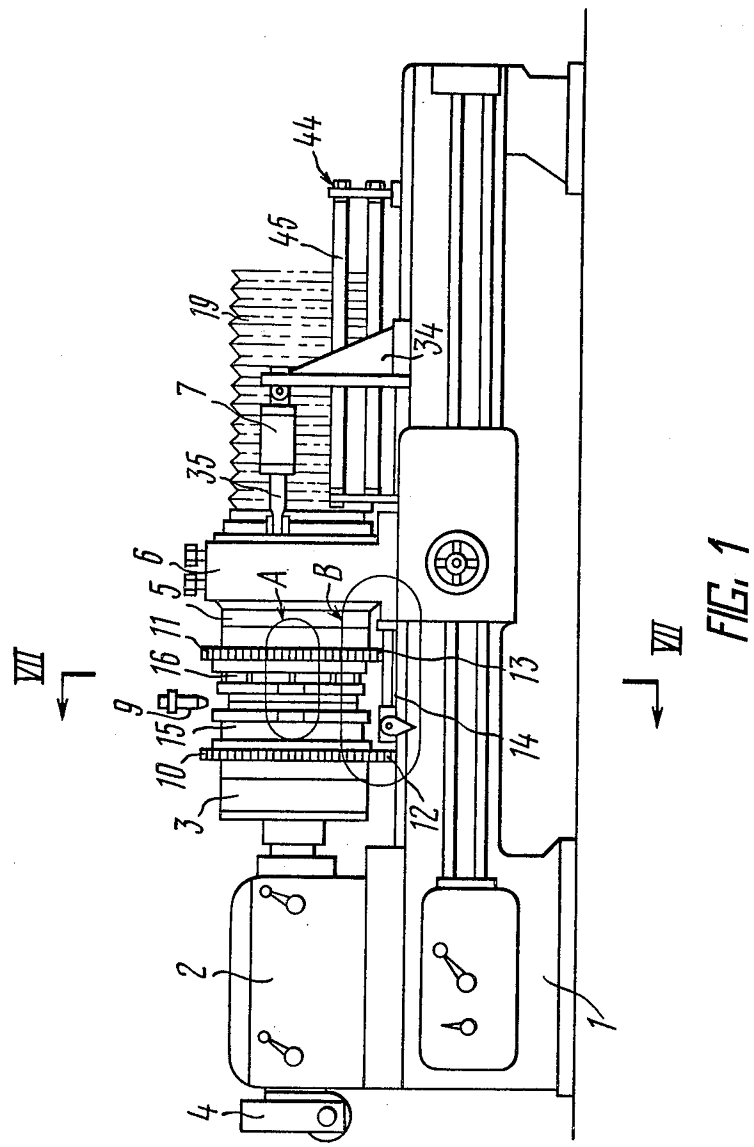
FIG. 1 is a side view of a welder according to the invention with a bellows (shown by the dot-and-dash lines)
Figure 8:
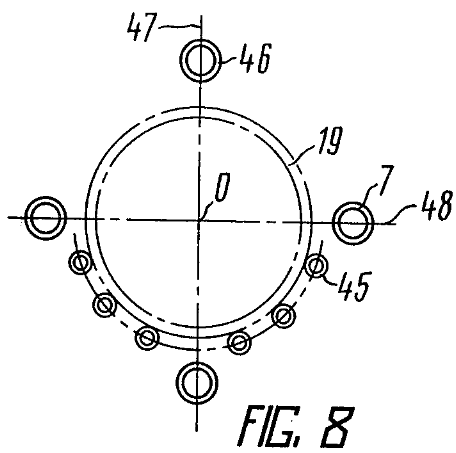
FIG. 8 is a schematic view of a first preferred arrangement of two pairs of pneumatic cylinders.
Figure 10:
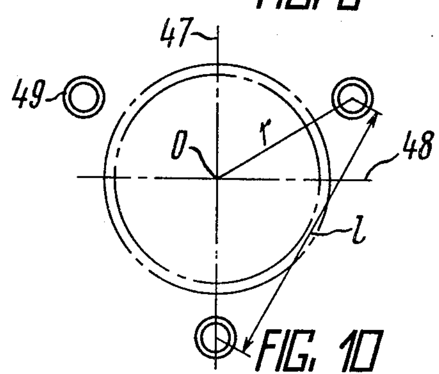
FIG. 10 is a schematic view of a preferred arrangement of three pneumatic cylinders.

To place the bellows sections 19 (FIG. 1) to be welded between the chucks 3 and 5, the movable support 6 is moved to its extreme position by the pneumatic cylinders 7, or by the pneumatic cylinders 7 and 46 shown in FIGS. 8 and 9, or by the pneumatic cylinders 49 shown in FIG. 10. Simultaneously, the rod 37 of the pneumatic cylinder 36 drives the welding torch 9 (FIG. 7) to the initial position away from the welding zone. The swivel means 22 (FIGS. 2 and 4) are turned so as to free the end faces of the split collar springs 20 and 21 (FIG. 3). The collar springs 20 and 21 are then fitted over the outer surfaces of the clip means 15 and 16 (FIGS. 1 and 3). The drive 30 (FIG. 6) moves the rack 29 so that the stops 25 are brought to a position which accounts for a minimum gap H between the end faces of the split collar springs 20 and 21 (FIG. 5).

The bellows sections 19 to be welded are inserted one by one into the holes of the clip means 15 and 16 (FIGS. 1 and 3). The projections 23 of the split collar springs 20 and 21 are introduced into the recesses 24 (FIG. 3) between the corrugations of the bellows section 19, whereupon the end faces of the collar springs 20 and 21 are brought together by the swivel means 22 (FIGS. 2 and 4).

Figure 5:
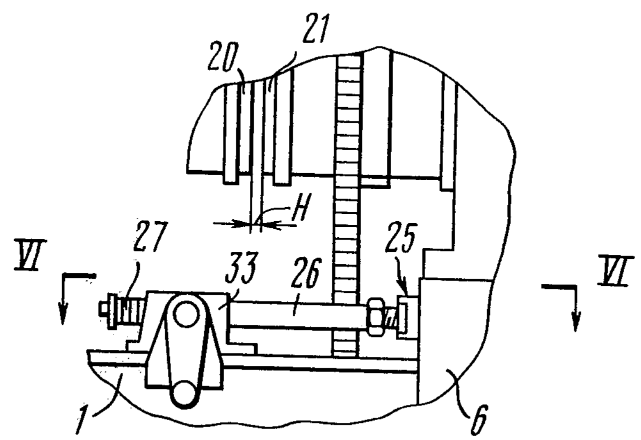
FIG. 5 is a closer view of zone B of the welder of FIG. 1.
Figure 6:
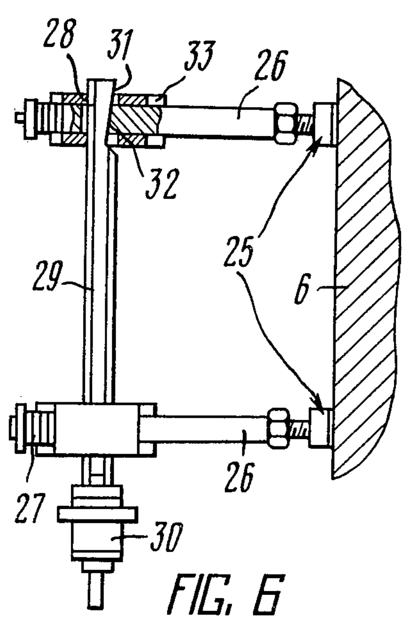
FIG. 6 is a longitudinal section taken on line IV—IV of FIG. 5.

The pneumatic cylinders 7 (FIG. 1) drive the movable support 6 to bring it into contact with the supports 25 (FIGS. 5 and 6). The expanding yoke 18 (FIGS. 3 and 7) is then tightened, and the bellows sections 19 to be welded are centered. The drive 30 (FIG. 6) then drives the rack 29 so that it releases the rods 26 which are brought by the springs 27 to the initial position. The pneumatic cylinders 7 (FIG. 1) bring together the edges of the bellows sections 19 centered by the yoke 18 (FIG. 3).

As this takes place, the elastic spacer 17 deforms and firmly presses the edges of the sections 19 one against the other over their entire perimeter. The halves of the yoke 18 (FIG. 7) are brought apart. The hollow rod 37 of the pneumatic cylinder 36 brings the welding torch 9 to the welding zone, whereupon the torch 9 is locked by the means 40 in the welding position. The drive 4 (FIG. 1) is then brought into action to rotate the chucks 3 and 5 and the bellows sections 19, and welding is carried out. In the course of welding, heat removal is improved due to the presence of the projections 23 (FIG. 3). The welding being over, the swivel means 22 (FIGS. 2 and 4) are turned so as to open the split collar springs 20 and 21 (FIG. 3) and thus removes the welded bellows sections 19 from the split collar springs 20 and 21.

To weld a new bellows section 19 to those already welded together, the welding torch 9 (FIG. 7) is moved away from the welding position, and the movable support 6 (FIG. 1) is driven to its initial position. The welded bellows sections 19 are moved to the means 44 for receiving welded bellows sections. The surfaces of the rollers 45 of the means 44 are coated with polyfluoroethylene resin, wherefore the surface of the bellows section 19 is not deformed as it rotates and moves in the longitudinal direction. The foregoing sequence of events is then repeated.

Tests have shown that the welder according to the invention can produce high-quality welded joints when butt-welding sections of thin-walled bellows. This is due to the fact that the bellows sections are accurately centered by the expanding yoke, and that their edges are uniformly and firmly pressed together by the clip means mounted on the chucks and provided with split collar springs. Improved dissipation of heat due to the provision of projections on the end faces of the split collar springs, which are received in the recesses between the corrugations of bellows sections, rules out burn-throughs. The welder according to the invention also rules out skewing of bellows sections being welded in the weld plane and with respect to the longitudinal axis of the bellows and the welding head, which is due to the fact that the bellows sections are firmly pressed together by the symmetrically arranged pneumatic cylinders, and that the welding head is firmly locked in the welding position.

Due to the above combination of features, the welder of this invention does not require any additional means to control the mutual positioning of the torch and weld, which are normally employed in butt welding of flexible profiled articles, such as bellows.

What is claimed is:

1. A welder for welding sections of bellows, comprising: a bed; a stationary support mounted on said bed; a rotatable driver chuck mounted on said stationary support; a movable support; a rotatable driven chuck mounted on said movable support with said movable support mounted on said bed for axial movement between a first position closely spaced from said driver chuck and a second position spaced a greater distance from said driver chuck, a bellows section to be welded being insertable between said chucks when said movable support is in said second position; a drive for rotating said driver chuck; a gear train for providing kinematic coupling between said driver and driven chucks; a support mounted on said bed adjacent said driver chuck and carrying a welding torch; a plurality of pneumatic cylinders mounted between said bed and said movable support for moving said movable support between said first and said second positions, the cylinders being rigidly coupled to said movable support and arranged symmetrically with respect to the longitudinal axis of the welder; annular clip means mounted on each of said chucks and extending towards each other, one clip means per each chuck, one of said clip means being spring-loaded in the direction of its chuck; split collar springs mounted on said clip means, one split collar spring per each clip means, said split collar springs having projections on their end faces to interact with respective recesses of corrugations of the bellows sections being welded; an expanding yoke for centering outer diameters of bellows sections being welded, said yoke being mounted on said bed between said chucks and resting, when in a working position, on said split collar springs and in engagement with the bellows sections to center said sections, two swivel means, each intended for tightening the respective split collar spring about said clip means so that said end face projections interact with the corrugations; adjustable stops mounted on said bed and interacting with said movable support for stopping said movable support in a position to perform the centering operation, said adjustable stop being releasable to allow further movement of said movable support to said first position to effect clamping of said bellows sections about their entire periphery; and means for receiving welded bellows sections mounted on said bed behind said movable support.

2. A welder as claimed in claim 1, wherein said gear train comprises gears mounted on said chucks and interacting with respective gears mounted on a shaft installed in bearings provided in said bed.

3. A welder as claimed in claim 1, wherein each of said adjustable stops is composed of a pair of spring-loaded rods, each having a transverse through hole to receive a rack provided with a drive for setting it in motion in the longitudinal direction and having slanted surfaces interacting with respective slanted surfaces of the walls of the holes provided in said rods, said rods and rack being arranged in guides mounted on said bed.

4. A welder as claimed in claim 1, additionally provided with at least one pair of pneumatic cylinders arranged symmetrically with respect to the horizontal and vertical planes extending through the longitudinal axis of the welder.

5. A welder as claimed in claim 1, comprising three pneumatic cylinders, said pneumatic cylinders being spaced at an equal distance from the longitudinal axis of said welder and at an equal distance from one another, and also arranged symmetrically with respect to the vertical plane extending through the longitudinal axis of the welder.

6. A welder as claimed in claim 1, wherein arranged in the plane of said yoke is the support carrying the welding torch, the support carrying a pneumatic cylinder with a rod extending through said cylinder which carries the welding torch at one end and a means for locking said torch in the welding position at its opposite end.

7. A welder as claimed in claim 1, wherein said means for receiving welded bellows sections comprises rollers spaced on a circular arc, their longitudinal axes being parallel to that of the welder.

8. A welder as claimed in claim 7, wherein the lateral surfaces of said rollers have a coating of polyfluoroethylene resin.

* * * * *